J. H. CULVER.
Safety Device for Elevator.

No. 220,222.              Patented Oct. 7, 1879.

Witnesses
Geo. H. Strong
Frank J. Brooks

Inventor
James Culver
By Dewey & Co.
Atty

UNITED STATES PATENT OFFICE.

JAMES H. CULVER, OF SAN FRANCISCO, CALIFORNIA, ASSIGNOR TO HAZARD P. HERRICK, OF SAME PLACE.

IMPROVEMENT IN SAFETY DEVICES FOR ELEVATORS.

Specification forming part of Letters Patent No. 220,222, dated October 7, 1879; application filed March 13, 1879.

*To all whom it may concern:*

Be it known that I, JAMES H. CULVER, of the city and county of San Francisco, and State of California, have invented an Improved Safety Device for Elevators; and I do hereby declare the following to be a full, clear, and exact description thereof, reference being had to the accompanying drawings.

My invention relates to an improved safety device for elevators; and it consists in constructing at the bottom of the elevator-well a box provided with flaring slots in its mouth, into which the elevator may fall in case the rope breaks or unwinds and the ordinary safety-clutches do not act. This box has suitable discharge-openings for the air to pass out gradually when the elevator or cage drops into it, and the partially-confined air acts as a cushion into which the cage falls, so that its speed is gradually checked and no harm results to the occupants of the cage. Springs are also placed on the bottom of the box, which will also tend to lessen the force of a fall, as is more fully described in the accompanying drawings.

Figure 1:
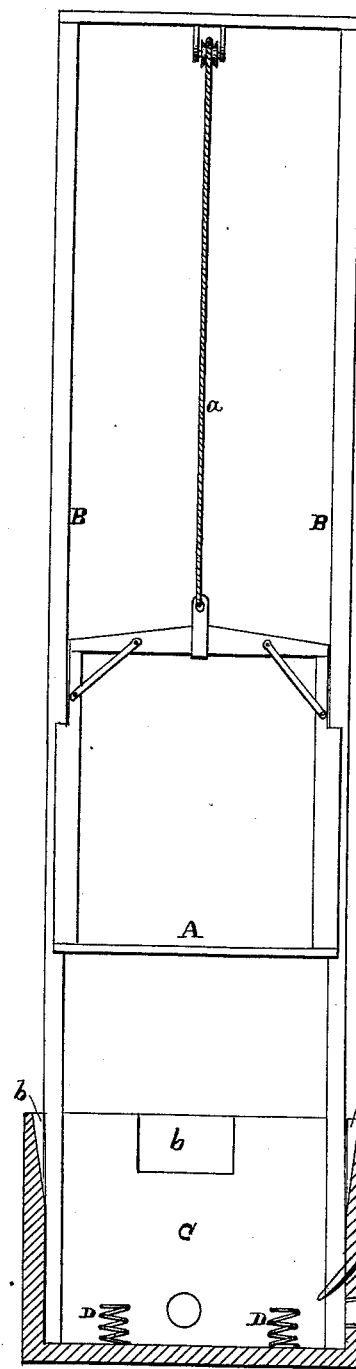
Figure 2:
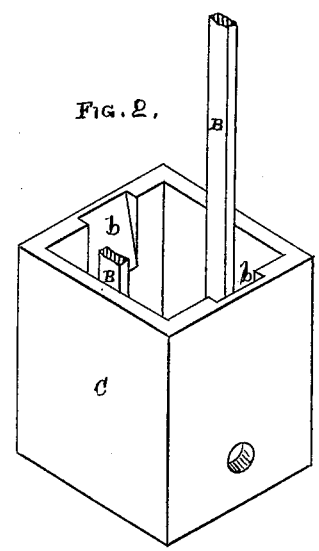

Figure 1 is a vertical section. Fig. 2 is a view of the box, showing the air-inclines.

Let A represent the elevator or cage, and B the guides between which it runs in the elevator-well, the cage being hoisted and lowered by the rope $a$ in the usual manner.

At the bottom of the elevator-well I construct or form a box, C, open at the top, and having the guides B continued down into it. The inside of this box is made of the same size as the floor of the elevator or cage, so that it will pass easily into said box, but fit pretty snugly to the sides.

On one or more sides of the box I cut an inclined slot, $b$, gradually enlarged near the upper edge, as shown, and extending, if necessary, all the way to the bottom of the box, through which the air may pass out when the cage enters the box and displaces it.

On the floor or bottom of the box or air-chamber are placed the springs or cushions D, which may be compressed when the floor of the cage rests on them.

The object of this construction is to prevent fatal or serious accidents from elevator-ropes breaking or unwinding.

It is well known that cages frequently fall when the rope does not break, but unwinds from the reel. When this occurs the safety-clutches seldom act, and the cage is precipitated to the bottom.

By having this air chamber or box at the bottom of the elevator-well, should any accident of any kind happen and the cage be precipitated downward, instead of the cage being broken to pieces and the occupants killed or maimed, it strikes on a cushion of air and is gradually brought to a stand-still.

As the floor of the cage or elevator first strikes into the box the air is compressed and begins to issue from the discharge-opening $b$, the opening gradually being reduced in size as the cage goes lower, while at the same time the air is more and more compressed. This action has the effect of slowing down the motion of the cage so gradually that no harm can occur to the cage or its occupants. As the cage nears the bottom it meets the springs, which it compresses, and is thus brought to a stop.

By thus falling onto an elastic compressible cushion of air no jar or shock is experienced, as is the case when the elevator strikes onto a floor or timbers at the bottom of the well.

Instead of the slots, the sides of the air-chamber may be made flaring to produce the same result.

These air chambers or boxes may be placed under elevators already in use, and insure safety of life and limb to the passengers.

The usual safety appliances may be used in connection with the elevator; but this air-chamber is only of use when all the other appliances fail.

There is no mechanism on this safety apparatus to get out of order, and its construction is simple.

The air-discharge openings from the chamber may, if desirable, be formed of pipes suitably connected with it.

I am aware that simple openings or perforations in the sides of the box are old, and such construction I do not claim; but I make it in the manner herein described, with the flaring slots.

Having thus described my invention, what I claim as new, and desire to secure by Letters Patent, is—

The box C, constructed with flaring slots $b$ in its mouth, substantially as set forth, and for the purpose described.

In witness whereof I have hereunto set my hand.

JAMES H. CULVER.

Witnesses:
   GEO. H. STRONG,
   FRANK A. BROOKS.